July 25, 1967  W. BLINDER  3,332,277
BEARING TESTING MACHINE
Filed Aug. 13, 1964  3 Sheets-Sheet 1

INVENTOR
WILLIAM BLINDER
Edward H. Goodrich
HIS ATTORNEY

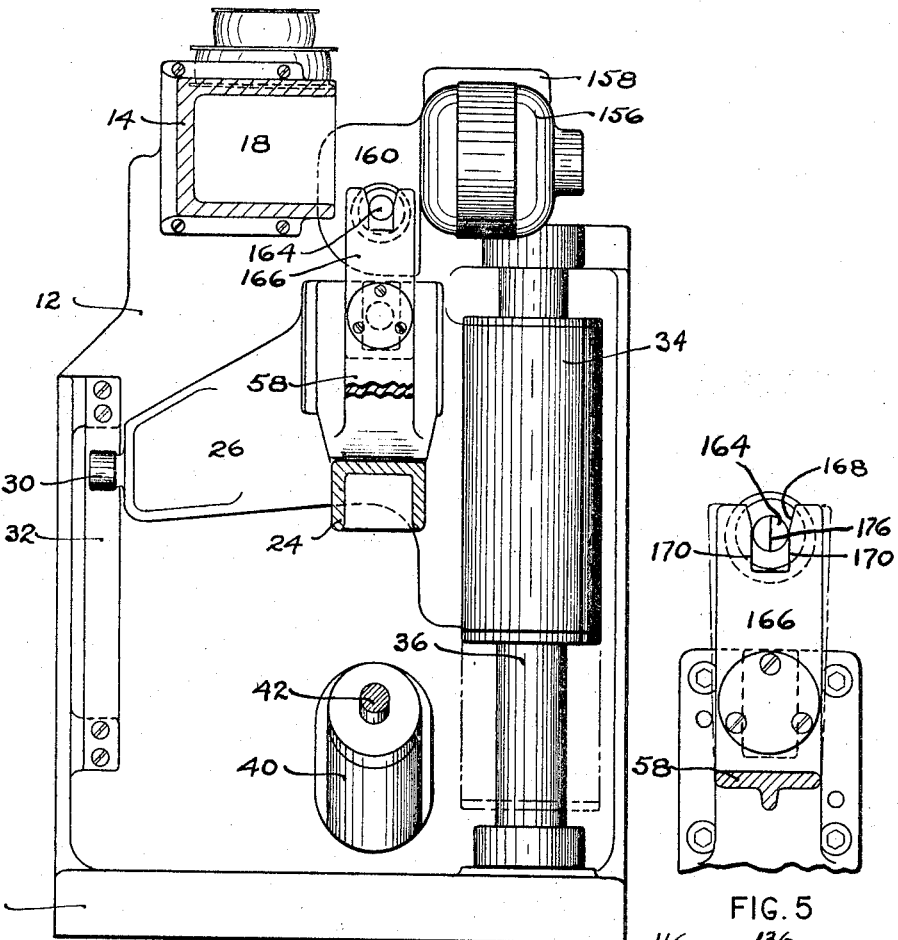
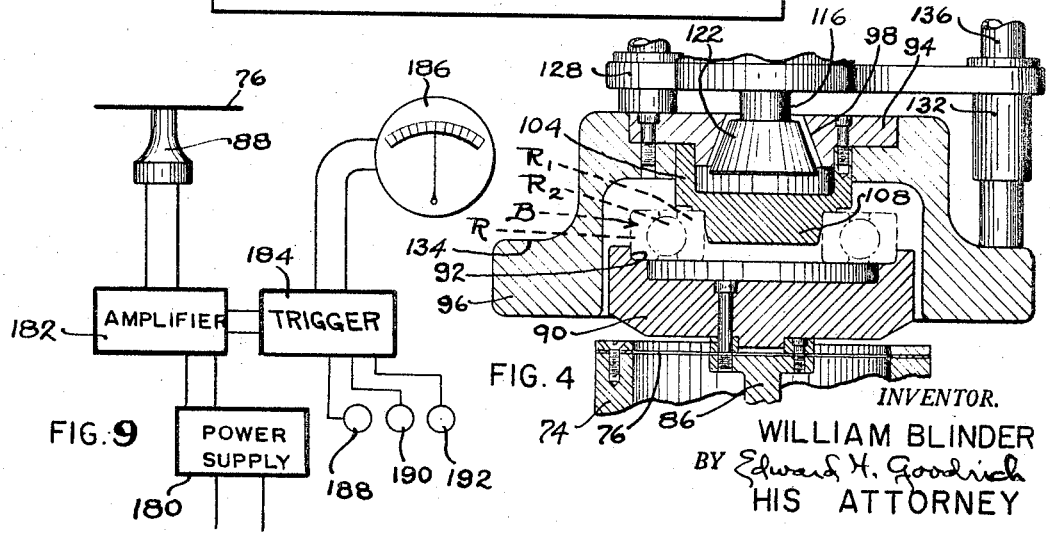

July 25, 1967  W. BLINDER  3,332,277

BEARING TESTING MACHINE

Filed Aug. 13, 1964 3 Sheets-Sheet 3

INVENTOR
WILLIAM BLINDER
Edward H. Goodrich
HIS ATTORNEY

United States Patent Office 3,332,277
Patented July 25, 1967

3,332,277
BEARING TESTING MACHINE
William Blinder, Newington, Conn., assignor to General Motors Corporation, Detroit, Mich., a corporation of Delaware
Filed Aug. 13, 1964, Ser. No. 389,329
10 Claims. (Cl. 73—67)

This invention relates to a testing machine for bearings and particularly to a machine for testing the smoothness of operation and quality of an antifriction bearing.

Antifriction bearings such as ball bearings are an important factor in the smooth reliable operation of many machines. With continuing demands for increased production, there is a growing need for precision ball bearings which will operate quietly at very high speeds and at a minimum of friction under load with the greatest possible smoothness. The smooth operation of a ball bearing depends upon many factors including the accuracy of the bearing parts, the precise interfitting of the relatively movable parts under load, freedom from dirt and extraneous material in the bearing, and the type as well as the amount of lubricant within the bearing. In fact, the smoothness of operation of a bearing is indicative of its quality.

Heretofore, it has been contemplated to test the smoothness of bearing operation by measuring the vibrations within a bearing support while a bearing mounted in the support was being power-driven under load. However, this prior testing arrangement has been both inaccurate and unsatisfactory since vibrations inherent in the driving mechanism compounded with vibrations produced by the bearing. Furthermore, additional inaccuracies frequently occurred due to incorrect mounting of the antifriction bearings in the driving mechanisms. There is, therefore, much demand for reliable easy to use equipment which will reject antifriction bearings which do not meet a predetermined high acceptance standard. It has been the practice in some instances to hand-hold an antifriction bearing on the end of the rotating shaft of a quiet running motor. Manual pressure is applied to the bearing to assume a loaded condition of operation. The operator then judges the quality of the bearing due to the sound emanating from the bearing and the feel in his hand of the vibration which may be set up within the bearing. Due to the human element and the manual pressure applied, this method of testing has many serious disadvantages, since one operator rarely duplicates the test made by another operator. Additionally, he usually fails to interpret the vibrations within the bearing in the same manner as does another operator. Furthermore, vibrations within the motor shaft are transmitted through the bearings to the operator thus contributing to an erroneous interpretation.

The present invention overcomes the many difficulties of these prior testing arrangements and provides an accurate bearing testing machine which automatically measures the smoothness of operation and the quality of an antifriction bearing operated under a predetermined load independent of any vibrations which may exist in the driving mechanism for this bearing. This invention provides reliable and accurate repeatability of measurement under successive corresponding tests on the same antifriction bearing.

It is, therefore, an object of my invention to provide an improved mechanism for automatically measuring the smoothness of operation and the running torque of an antifriction bearing.

It is a further object of this invention to provide an improved mechanism for automatically measuring the smoothness of operation of an antifriction bearing independent of the driving mechanism for the bearing.

It is a still further object of this invention to provide an improved mechanism for automatically measuring the vibration in an antifriction bearing when operated under predetermined conditions.

It is a further object of this invention to provide an improved antifriction bearing testing mechanism which responds solely to the vibrations set up within the bearing while rotating under predetermined conditions of speed and load.

To these ends and to improve generally upon devices of this character, this invention consists in the various matters hereinafter described and claimed. In its broader aspects, the invention is not necessarily limited to the specific arrangements selected for illustrative purposes in the accompanying drawings wherein FIGURE 1 is a side elevation of my bearing testing machine with parts cut away to better illustrate their operation.

FIGURE 3 is a fragmentary front view of the invention.

FIGURE 4 is a fragmentary sectional view showing the bearing mounting and associated parts.

FIGURE 5 is a fragmentary view of the tilting mechanism.

FIGURE 9 is a schematic view of the measuring mechanism.

Figure 2:
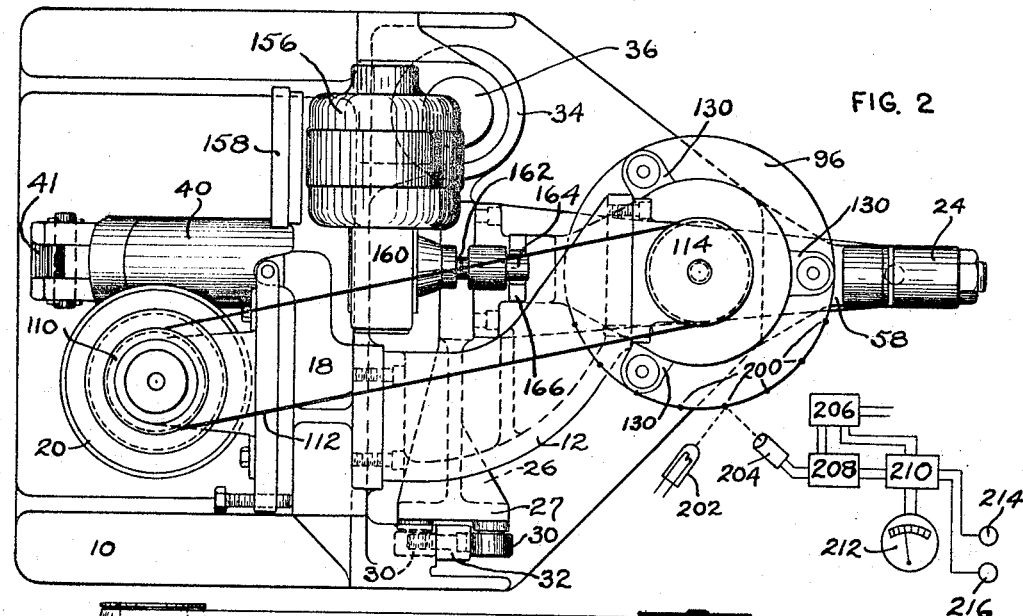
FIGURE 2 is a plan view and schematic showing of the invention.

As illustrated in the drawings, a base 10 is provided with an upwardly extending leg 12 having at its upper end a generally horizontal and forwardly projecting arm 14 that terminates in a head 16. A projection 18 at the rearward upward end of the leg 12 supports a motor 20 having a vertical shaft. A horizontally disposed yoke 24 is secured at its rearward end to the intermediate portion of a cross arm 26 arranged for vertical movement in front of the vertical leg 12. One end of this cross arm terminates in a flanged portion 27 from which projects pins upon which are respectively mounted a pair of laterally spaced rollers 30 arranged for rolling engagement against the opposite side walls of a vertical bar 32 rigidly supported in laterally spaced relation to the front of the leg 12. The opposite end of the cross arm 26 terminates in a vertical sleeve 34 slidably fitting on a vertical post 36 extending upwardly from the base 10 in laterally spaced relation to the forward portion of the leg 12. A cylinder 40 pivotally mounted at its rearward end to a bracket 41 on the base, receives a slidable piston fastened to a piston rod 42 that is pivotally connected to two links 44 and 46 which are respectively pivotally connected to a bracket 48 on the base 10 and to the lower intermediate portion of the yoke 24. Fluid under pressure is selectively directed to and exhausted from pipes 54 and 56 in the cylinder at each side of the piston to vertically raise and lower the yoke 24.

Figures 7, 8:
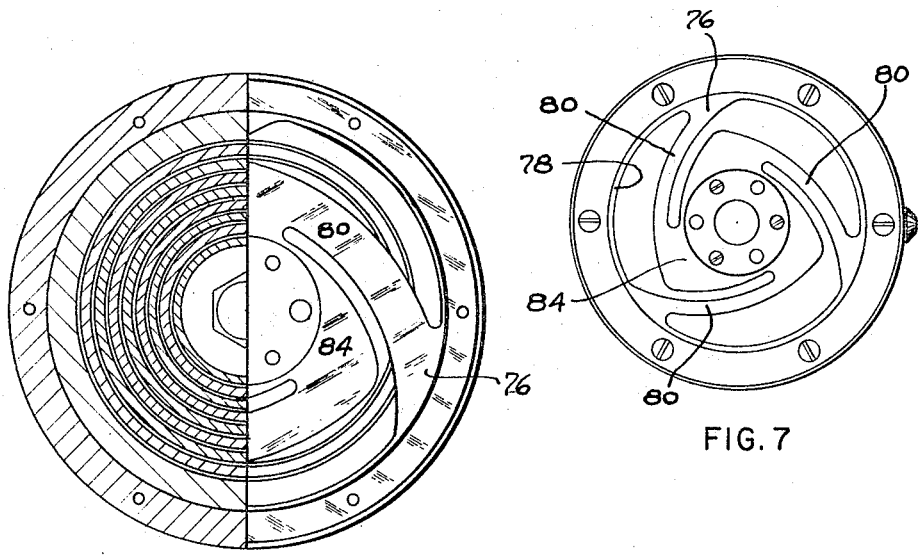
FIGURE 7 is a detail showing the spring mounting for the bearing support and taken along the lines 7—7 of FIGURE 6.
FIGURE 8 is a cut-away view taken substantially along the line 8—8 of FIGURE 6

A bifurcated support 58 has upstanding arms 60 and 62 coaxially journalled for pivotal movement on bearings 64 and 66 at the ends of the yoke 24. These bearings may be of any suitable construction and are herein illustrated as adjustable ball and socket pivots. The intermediate depending portion of the support 58 has a substantially vertical through bore 70 provided with a counterbored upper portion in which is rigidly secured a sleeve 74 having a through bore preferably forming a continuation of the bore 70. A pair of similar annular spring members 76 formed from suitable sheet material, as thin spring steel, have rim portions 78 tightly clamped to the upper and lower ends of the sleeve 74 as by clamping rings and screws. As illustrated in FIGURE 7, each spring 76 may comprise a thin resilient stamped-out member having inwardly extending circumferentially spaced arcuate arms 80 integral at their outer ends with the rim 78 and integral at their inner ends with a central spring portion 84. A spacing member 86 extends between the springs 76 and has flat end faces seated against the central spring portions 84. The central portion of the lower spring 76 is firmly clamped between the lower end face of the spacing member 86 and a vibration responsive member 88 which regulates a signal produced therein in response to vertical vibrations produced by the bearing being tested.

An annular bearing support 90 which is preferably concentric with the springs 76, is suitably mounted as by screws on a collar centrally disposed on the upper side of the upper spring 76. The central portion 84 of this upper spring is firmly clamped between this collar and the upper flat end of the spacing member 86. Hence, any vibration imparted by the bearing being tested to the bearing support 90 will be transported through the resilient spring mountings to the vibration-responsive member 88. The bearing B to be tested is herein shown as a conventional antifriction bearing having an outer race ring R, an inner race ring $R_1$ and intervening rolling elements $R_2$ engaging within the usual raceways of an antifriction bearing. The upper end of the bearing support 90 has a counterbore 92 which is preferably coaxial to the sleeve 74 to snugly but demountably receive the outer race ring R with the remaining portions of the bearing B in spaced relation to this support.

A clutch driving member 94 is fastened in the counterbored upper end of a flywheel 96 which coaxially overhangs the bearing B and its support 90 in radially spaced relation. This clutch member has a conical clutch face 98 which is coaxial with the flywheel and which has its least diameter at the upper end of the member 94. A short vertical shaft 104 has a recessed upper cylindrical skirt demountably and rigidly secured as by screws within a central vertical flywheel bore and against the lower end of the member 94 which preferably extends downwardly within this skirt. The lower end of the shaft 104 terminates in a depending pilot plug 108 of reduced diameter coaxial of the flywheel and which demountably and sugly fits within the bore of the inner race ring $R_1$ of the bearing to be tested. The upper end of the pilot plug portion 108 terminates in a flat annular shoulder which seats against the flat upper end of this inner race ring during testing to support the flywheel on the test bearing B. The annular bearing support 90 and the shaft 104 are demountable and may be replaced by corresponding parts of different sizes to receive bearings of various sizes to be tested. Hence, this test apparatus is not limited to bearings of any particular size.

Figure 1:
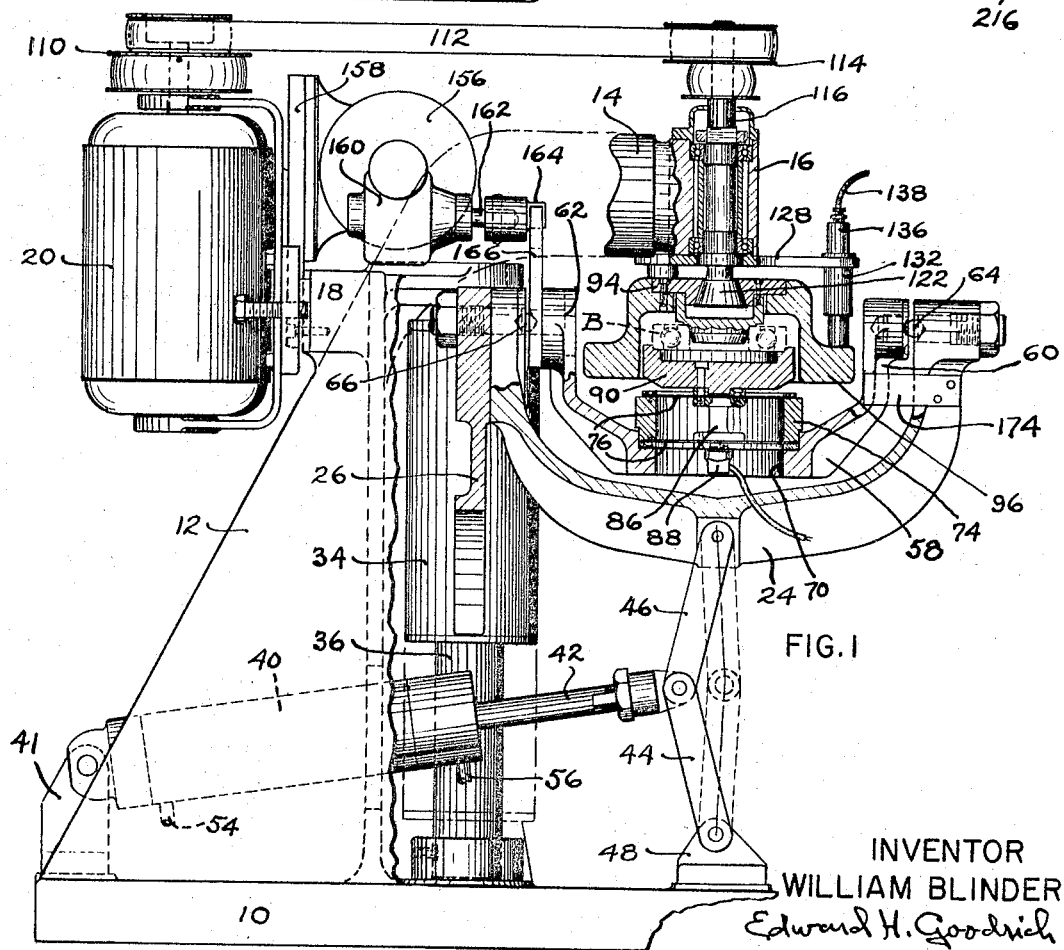
Figure 6:
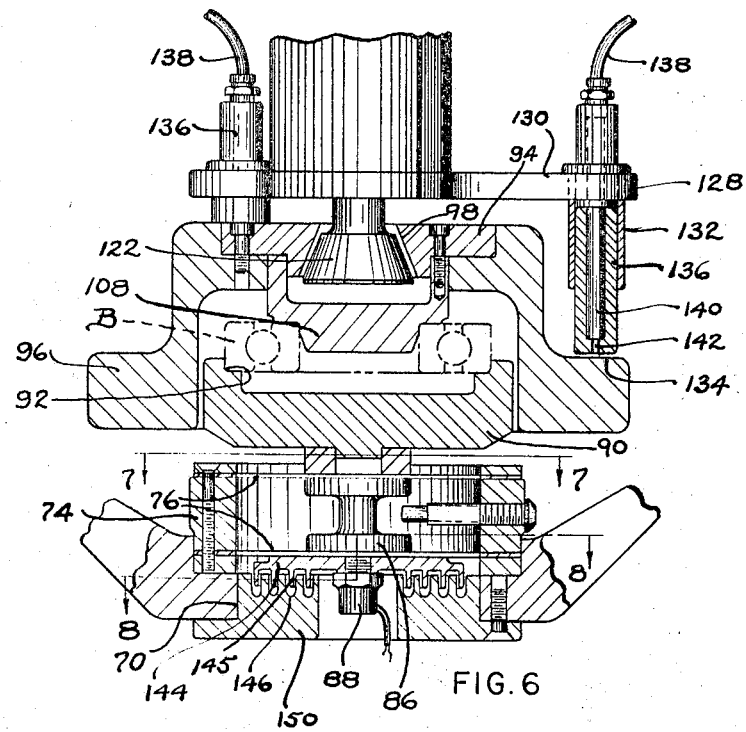
FIGURE 6 is a sectional view showing the bearing mounting and damping mechanism.

A disengageable drive to the flywheel 96 is effected from a pulley 110 on the motor 20 through a belt 112 to a pulley 114 on the upper end of a vertical shaft 116 coaxial with the conical clutch face 98. The shaft 116 is mounted in suitable bearings, as ball bearings, supported within the head 16. The pulleys 110 and 114 may be of the stepped type to provide for different speeds of rotation for different sizes of bearings to be tested. The lower end of the shaft 116 terminates in a driven conical clutch member 122 adapted to matingly fit in declutchable engagement with the clutch face 98 as shown in FIGURES 1, 4 and 6. This clutching and declutching is effected through movement of the links 44 and 46 between their illustrated full line and dotted line positions under control of piston movement within the cylinder 40.

In some instances when testing a small diameter bearing, the radial overhang of the flywheel 96 may be sufficient to result in an uneven rotation of the flywheel. To avoid this condition, there has been provided a stabilizing mechanism. A plate 128 secured to the lower end of the head 16 above the flywheel has a plurality of uniformly spaced outwardly extending arms herein illustrated as the three arms 130. A sleeve 132 is tightly fitted within and vertically extends downwardly through a bore in each arm 130 into spaced relation with the flat upper face 134 of a lower flanged portion of the flywheel. A cylindrical piston 136 fits for freely slidable movement within the vertical bore through each sleeve 132 and due to its mass tends to slide downwardly in the sleeve unitl the flat lower end of the piston rests on the flat flywheel face 134 as illustrated in FIGURE 4. A freely flexible tubing 138 connects through a suitable fitting in the top of each piston and communicates with the upper end of a vertical bore 140 within the piston which has a restricted opening 142 at its lower end opening onto the flywheel. A viscous lubricant as a heavy grease is located between the interior wall of each sleeve and the exterior wall of the piston therein. During operation, air under predetermined pressure is pumped through each hose 138 and exhausts from the ports 142 against the flat rotating surface 134 of the flywheel thus providing between the lower end of each piston 136 and the flywheel an air bearing which is sufficient to prevent metal to metal contact of the piston with the flywheel. If the flywheel tends to assume an unstable rotation, the mass of the air bearing supported pistons 136 coupled with the viscous damping effect of the lubricant between the sleeves 132 and the pistons will immediately stabilize flywheel rotation.

It is well known that a spring system has a natural frequency of vibration, often referred to as a resonant frequency, which is a function of the spring rate or stiffness of the spring and the mass of the system. An antifriction bearing operating under load behaves as a non-linear stiff spring and may have a natural frequency of vibration when operated at certain speeds. However, the magnitude of this vibration output at this natural frequency is not directly related to the quality or smoothness of operation of an antifriction bearing since the effect of vibration frequencies near this point of resonance are appreciably accentuated at the expense of vibrations remote from this point of resonance. Consequently, as shown in FIGURE 6, I have provided a damping mechanism for this natural frequency. A ring member 144, clamped between the lower spring 88 and the vibration-responsive member 88, has a series of coaxial radially spaced downwardly projecting annular fins 145 which extend into correspondingly located annular grooves 146 in a plate 150 fastened within the bore 70 in the member 58. These annular fins 145 respectively project into a viscous fluid in the grooves 146 in spaced relation to the side walls of these grooves 146. The movement of these fins in this viscous fluid damps the natural frequency of the bearing and its spring support 76 and, hence, permits the vibration-responsive member 88 to respond to bearing vibrations which might be produced in this natural frequency range due to inaccuracies in the bearing.

To subject the bearing under test to conditions which provide greater coverage of ball and raceway surfaces than can be provided by pure axial thrust, it is often desirable to submit this bearing to an uneven load during testing by rocking the bearing about a transverse axis which is generally perpendicular to the axis of rotation of the inner race ring $R_1$. A motor 156 mounted on a pedestal 158 at the upper end of the leg 12 is provided with a speed reduction unit 160 to slowly rotate a shaft 162 on which is secured an eccentrically mounted roller 164. An upwardly projecting arm 166 secured to the bifurcated member 58 adjacent the yoke 24, has a generally vertical slot 168 extending downwardly from its upper end. This slot is preferably flared at its open upper end and has a lower portion provided with parallel side walls 170 spaced apart just sufficiently to rotatably receive the cylindrical roller 164. This slot 168 is so positioned with respect to the axis of the tilt bearings 64 and 66, that the eccentric roller 164 is entered between the parallel spaced side walls 170 after the fluid pressure operated link mechanism 44, 46 has lifted the flywheel out of clutch engagement with the clutch member 122. Hence, this rocking movement occurs only during operation of the bearing under influence of the declutched coasting flywheel. The eccentric rotation of the roller 164 between the side walls 170 produces this slight rocking movement to the bifurcated member 58 as best illustrated in FIGURE 5. A pair of flat leaf springs 174 are respectively secured on opposite sides of the upper end of the yoke member 24 and have their resilient inner ends in engagement with pads on the bifurcated member 58 to normally urge the member 58 to an intermediate position wherein the axis of the test bearing is vertically located. If it is desired to perform a bearing testing operation without imparting a rocking movement to the bearing, the motor 156 may be stopped with the cam roller 168 located in an intermediate position as indicated by a diametrical index mark 176 on the roller 164.

As diagrammatically illustrated in FIGURE 9, current from a suitable power source 180 is fed to an amplifier 182. The vibration responsive member 88 is affected by the mechanical vibrations within the bearing during its test operation and controls the amplifier 182 which in turn transmits signals to triggering circuits 184. Two measuring circuits are responsive to the triggering circuits 184. The first circuit measures the overall vibration conditions within the bearing while being driven by the coasting flywheel 96, and feeds the entire signal from the amplifier to a meter 186 which measures the vibrations within the bearing during testing. The amplifier 182 is preferably provided with a gain characteristic to compensate for the mechanical response of the vibration system thus providing a relatively flat response at the meter 186. The triggering circuits 184 also include two adjustable preset peak level circuits responsive to this first measuring circuit—these peak level circuits respectively controlling the lighting of indicator lamps 188 and 190. Lamp 188 lights during the bearing test to indicate a bearing which has acceptable smoothness of operation and which meets a required standard of quality. Lamp 190 lights during the bearing test to indicate that the bearing vibrations are above an acceptable predetermined level to show that the bearing fails to meet the required level of quality. Certain types of defects such as minute nicks may not sufficiently record on the meter 186 or at the lamp 190.

Consequently, the second measuring circuit operates through a part of the triggering circuit whose time constant is preadjusted to respond to the sharp high frequency signal produced, as indicated by a lamp 192, which lights only when the signal from the nicks exceeds a predetermined level.

This bearing testing machine also measures the runing torque of the bearing under influence of the coasting flywheel. As illustrated, in FIGURE 2, the flywheel 96 is provided on its periphery with a plurality of uniformly circumferentially spaced index marks 200 which have a color density in contrasting relation to the rest of the flywheel periphery. A light beam from a lamp 202 is focused on the flywheel periphery and reflected therefrom to a photocell 204. The uniformly spaced marks 200 interrupt the response of the photocell depending on the speed of rotation of the flywheel. Current from a suitable power source 206 is fed to an amplifier 208 and to a frequency discriminator 210 which includes a timer. A meter 212 responsive to the frequency discriminator indicates the deceleration of the flywheel rotation during a predetermined period controlled by the timer. Preferably, this meter 212 is graduated to indicate the operating torque of the bearing under influence of the flywheel which starts its coasting rotation at a predetermined r.p.m. The start of this torque measurement is made during this predetermined speed of flywheel rotation. The frequency discriminator 210 also includes two peak level trigger circuits which are coordinated with the timer and connected in circuit with indicator lamps 214 and 216. The lamp 214 controlled by its peak level trigger circuit lights to indicate a bearing whose torque load is acceptable and lamp 216 lights to indicate that the tested bearing has an unacceptable torque. This invention additionally contemplates other sources of response to the decelerating flywheel. For example, the flywheel periphery may alternatively be provided with a series of uniformly circumferentially spaced holes instead of the index marks 200 and the lamp 202 and photocell 204 could be replaced by a magnetic sensing device in circuit with the amplifier 208.

In operation, a control valve (not shown) associated with the cylinder 40 is operated to lower the yoke 24 and associated bearing supporting mechanism including the annular bearing support 90 to a position where this bearing support is easily accessible beneath the flywheel. This valve may be manually operated or, if desired, the valve and associated electronic controls may respond to loading and unloading of the bearing being tested. The bearing B to be tested is mounted in position with its outer race ring snugly seated within the counterbore 92. This valve is thereafter operated to shift the linkage 44, 46 to dot-indicated positions causing the yoke 24 and associated bearing support to lift the bearing axially upwardly until the inner race ring $R_1$ of the bearing tightly fits against the depending pilot 108 associated with the flywheel 94. During this upward lifting movement of the bearing support, the leaf springs 174 maintain the bore of the inner race ring $R_1$ in axial alignment with the pilot plug 108 since the cam roller 164 does not engage between the base vertical walls 170 of the member 166 until the bearing has been lifted sufficiently to disengage the clutch members 96 and 122. Prior to the lifting of the bearing into operative position, the flywheel 94 is rapidly rotating at a desired speed under control of the motor 20 and the associated belt drive. Hence, when the bearing B is lifted into a position where the rotating pilot 108 snugly fits within the inner race ring, the driven flywheel immediately imparts to the bearing a desired rate of rotation for subsequent testing.

A further lifting of the bearing through continued upward movement of the yoke 24 to its final upper position, disengages the clutch drive between the members 96 and 122 as indicated in FIGURE 4 causing a subsequent coast of the flywheel 94 wherein the only rotation imparted to the bearing is from the coasting flywheel. The motor driven cam roller 164 causes a slight rocking movement of the bearing during test. If it is desired to test a bearing without employing this rocking movement, the motor 156 may be stopped with the index mark 176 located in a vertical position as shown in FIGURE 5. The flywheel 94 normally is of sufficient mass and size to rotate the inner race ring of the bearing with the balls in positively rolling raceway engagement. It will be appreciated, of course, that were bearings are to be tested for outer race ring rotation, the bearing mounting and the flywheel engagement with the bearing can be correspondingly changed for fitting relation with the inner and outer race rings. The meter 186 measures the vibration level within the operating bearing and the lamps 188 and 190 provide a convenient and quick method for the operator to determine acceptable and unacceptable bearings within predetermined limits. The lamp 192 indicates minute bearing nicks.

I claim:

1. In a machine for testing the smoothness of operation of an antifriction bearing having a pair of relatively rotatable race rings engaged by intervening rolling elements, means supporting one of the race rings, a flywheel detachably engageable with said other race ring to rotatably drive said other race ring, driving mechanism including a clutch to support and rotatably drive said flywheel, means providing for a relative axial shifting movement between the bearing and said flywheel to bring said other race ring into flywheel driven engagement and to disengage said clutch whereby rotation of said other race ring will continue under influence of the coasting flywheel, mechanism to indicate the smoothness of bearing operation under influence of the coasting flywheel, and means responsive to the coasting flywheel during a predetermined time to indicate the torque to rotate said race ring.

2. In a machine for testing the smoothness of operation of an antifriction bearing having a pair of relatively rotatable race rings with intervening rolling elements, means non-rotatably supporting one of the race rings about a substantially vertical axis, a flywheel arranged to be supported by and to rotatably drive said other race ring, driving mechanism including a clutch for supporting the flywheel, means to relatively axially shift the bearing with respect to the flywheel to initially locate the flywheel in driving engagement with said other race ring and to subsequently disengage the clutch, said outer race ring continuing its rotation under influence of the race ring supported coasting flywheel, and vibration responsive mechanism to measure the smoothness of bearing operation under influence of the race ring supported coasting flywheel.

3. In a machine for testing the smoothness of operation of an antifriction bearing having a pair of relatively rotatable race rings engaged by intervening rolling elements, means non-rotatably supporting one of the race rings, a flywheel arranged to be supported by and to rotatably drive said other race ring, a clutch for supporting the flywheel, clutch driving mechanism, means to transfer support of the clutch-driven flywheel to said other race ring and to disengage said clutch whereby the flywheel will coast while supported by said other race ring, and electrical means to measure the smoothness of operation of said bearing while said other race ring supports the coasting flywheel.

4. In a machine for testing the smoothness of operation of an antifriction bearing having a pair of relatively rotatable race rings engaged by intervening rolling elements, means non-rotatably and resiliently supporting one of the race rings, a flywheel detachably engageable with said other race ring to rotate said other race ring, driving mechanism including a clutch to support and rotatably drive said flywheel, means providing a relative axial shifting movement between the bearing and the flywheel to first locate said other race ring in flywheel driven engagement and to subsequently disengage said clutch whereby said other race ring will continue to rotate under influence of the coasting flywheel, and vibration responsive mechanism associated with the bearing to indicate smoothness of operation of said bearing.

5. In a machine for testing the smoothness of operation of an antifriction bearing having a pair of relatively rotatable race rings engaged by intervening rolling elements, resilient means supporting one of the race rings, a flywheel detachably engageable with said other race ring to rotatably drive said other race ring, driving mechanism for the flywheel, a clutch between the driving mechanism and said flywheel, means providing for a relative axial shifting movement between the bearing and said flywheel to initially locate said other race ring in flywheel supporting driven engagement and to thereafter disengage said clutch, the rotation of said other race ring continuing under influence of the coasting flywheel, mechanism to tiltably rock the bearing about an axis transverse to that of its rotation, and vibration responsive means associated with the first mentioned race ring for indicating smoothness of bearing operation.

6. In a machine for testing the smoothness of operation of an antifriction bearing having a pair of relatively rotatable race rings engaged by intervening rolling elements, means non-rotatably and yieldably supporting one of said rings about a substantially vertical axis, a flywheel arranged to be demountably supported by and to rotatably drive said other race ring, a clutch for detachably supporting the flywheel out of driving engagement with said other race ring, clutch driving mechanism, means to selectively transfer support of the flywheel to said other race ring and to disengage said clutch whereby the flywheel will freely coast in race ring driving relation, mechanism to axially tilt the bearing while under the influence of the coasting flywheel, and vibration responsive means for measuring the smoothness of bearing operation while said other ring is being driven by the coasting flywheel.

7. In a machine for testing the smoothness of operation of an antifriction bearing having a pair of relatively rotatable race rings engaged by intervening rolling elements, means non-rotatably and yieldably supporting one of said rings about a substantially vertical axis, a damping mechanism associated with said last-mentioned means to damp the natural frequency of the bearing vibration, a flywheel, a clutch arranged to detachably support the flywheel adjacent said other race ring, clutch driving mechanism to rotate the flywheel, a pilot portion on the flywheel demountably engageable with and arranged to support the flywheel on said other race ring, mechanism to shift the bearing into supporting engagement with said pilot portion and to subsequently disengage the clutch whereby said other race ring will be driven by the coasting flywheel, means to tiltably rock the bearing about an axis transverse to the bearing axis after said clutch has been disengaged, mechanism to stabilize flywheel rotation, and vibration responsive means for measuring the smoothness of bearing operation while said other race ring is being rotated.

8. In a machine for testing the smoothness of operation of an antifriction bearing having a pair of relatively rotatable race rings engaged by intervening rolling elements, resilient means supporting one of the race rings about a vertical axis, a damping mechanism associated with the resilient means to damp the natural frequency of the bearing vibration, a flywheel, a rotatably driven clutch for supporting and driving the flywheel about a vertical axis coincident with that of the bearing, a flywheel projection demountably fitting against said other race ring for supporting the flywheel in driving engagement with said other race ring, mechanism providing for a relative axial shifting movement between the flywheel and the bearing to initially locate the flywheel in supported driving engagement with said other race ring and to subsequently disengage said clutch whereby rotation of said other ring will be under control of the coasting flywheel, mechanism to stabilize flywheel rotation, and vibration responsive mechanism associated with the first mentioned race ring to indicate smoothness of bearing operation.

9. In a machine for testing the smoothness of operation of an antifriction bearing having a pair of relatively rotatable race rings engaged by intervening rolling elements, means non-rotatably supporting one of the race rings about a vertical axis, a driven flywheel for rotating said other race ring and having a flat substantially horizontal surface, a piston slidably movable towards and from said surface, said piston having a vertical aperture therethrough opening onto said surface, means providing fluid under pressure within the piston and exhausting between the end of the piston and said surface to support the piston in stabilizing relation to and out of engagement with the flywheel, and vibration responsive mechanism associated with one of the race rings to indicate smoothness of bearing operation.

10. In a machine for testing the smoothness of operation of an antifriction bearing having a pair of relatively rotatable race rings engaged by intervening rolling elements, means non-rotatably and resiliently supporting one of the race rings about a vertical axis, a flywheel, a clutch arranged to support and drive the flywheel, mechanism to transfer support of the rotating flywheel to said other race ring and to disengage said clutch whereby said other ring will be rotated by the coasting flywheel, a damping mechanism associated with the resilient support for the non-rotatable race ring to damp the natural frequency of bearing vibration, and vibration responsive mechanism to measure the smoothness of bearing operation while the said other ring is being rotated by the coasting flywheel.

References Cited

UNITED STATES PATENTS

| | | | |
|---|---|---|---|
| 2,468,648 | 4/1949 | Abbott et al. | 73—67 |
| 2,796,759 | 6/1957 | Baugh et al. | 73—67 |
| 2,882,034 | 4/1959 | Wuerth | 73—503 XR |
| 3,023,604 | 3/1962 | Gordon et al. | 73—67 XR |

FOREIGN PATENTS 1,104,710  4/1961  Germany.

JAMES J. GILL, *Acting Primary Examiner.*